(12) United States Patent
Gordon et al.

(10) Patent No.: US 11,608,452 B2
(45) Date of Patent: Mar. 21, 2023

(54) UV LIGHT CURABLE ADHESIVE AND DEVICE WITH UV LIGHT CURABLE ADHESIVE

(71) Applicant: Adhesives Research, Inc., Glen Rock, PA (US)

(72) Inventors: Thomas R. Gordon, Harrisburg, PA (US); Christina T. Nolen, Eldersburg, MD (US); Donald Herr, Lancaster, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 60 days.

(21) Appl. No.: 16/796,367

(22) Filed: Feb. 20, 2020

(65) Prior Publication Data
US 2020/0263057 A1    Aug. 20, 2020

Related U.S. Application Data

(60) Provisional application No. 62/807,893, filed on Feb. 20, 2019.

(51) Int. Cl.
*C09J 4/00* (2006.01)
*C09J 135/02* (2006.01)
*C08K 5/49* (2006.01)
*C08K 5/36* (2006.01)
*B32B 7/12* (2006.01)

(52) U.S. Cl.
CPC ............ *C09J 4/00* (2013.01); *B32B 7/12* (2013.01); *C08K 5/36* (2013.01); *C08K 5/49* (2013.01); *C09J 135/02* (2013.01)

(58) Field of Classification Search
CPC ....................................................... C09J 4/00
See application file for complete search history.

(56) References Cited

U.S. PATENT DOCUMENTS

| | | |
|---|---|---|
| 5,989,778 A | 11/1999 | Hozumi |
| 6,180,200 B1 | 1/2001 | Ha et al. |
| 6,472,451 B2 | 10/2002 | Ha |
| 9,453,144 B2 | 9/2016 | Hayashi |
| 9,546,305 B2 | 1/2017 | Hammond |
| 9,783,713 B2 | 10/2017 | Zhang |
| 10,174,146 B2 | 1/2019 | Morin |
| 10,273,384 B2 | 4/2019 | Wu |
| 2006/0100352 A1 | 5/2006 | Arnold |
| 2007/0211111 A1 | 9/2007 | Hayata |
| 2010/0242790 A1 | 9/2010 | Belelie |
| 2016/0312080 A1 | 10/2016 | Richter |
| 2017/0252971 A1* | 9/2017 | Umebayashi .......... C09D 11/34 |
| 2018/0290377 A1 | 10/2018 | Talken et al. |
| 2018/0320006 A1 | 11/2018 | Lee |

FOREIGN PATENT DOCUMENTS

| | | |
|---|---|---|
| EP | 0144148 A2 | 6/1985 |
| EP | 1980565 A1 | 10/2008 |
| JP | 2011213931 A | 10/2011 |
| WO | 9950368 | 10/1999 |
| WO | 2007048819 A1 | 5/2007 |

OTHER PUBLICATIONS

Search Report issued to European counterpart Application No. 20716594.5 dated Oct. 25, 2022.

* cited by examiner

*Primary Examiner* — Wenwen Cai
(74) *Attorney, Agent, or Firm* — McNees Wallace & Nurick LLC

(57) ABSTRACT

A UV light curable adhesive is disclosed, comprising, at least one bi-active monomer, at least one polymerizable oligomer, a primary photoinitiator, and a monomer scavenger, wherein photopolymerization of the at least one bi-active monomer by the primary photoinitiator activates the monomer scavenger, reducing residual monomer content in a cured adhesive formed by the photopolymerization of the bi-active monomer in comparison to an otherwise identical comparative UV adhesive lacking the monomer scavenger. A method for curing the UV light curable adhesive is disclosed, including applying the UV light curable adhesive to a surface and exposing the UV light curable adhesive to UV light, free from heating the UV light curable adhesive other than any autogenous increases in temperature from exothermic polymerization reactions. A device with the UV light cured adhesive is disclosed, including the UV light cured adhesive joining a first surface to a second surface.

31 Claims, 1 Drawing Sheet

US 11,608,452 B2

UV LIGHT CURABLE ADHESIVE AND DEVICE WITH UV LIGHT CURABLE ADHESIVE

CROSS-REFERENCE TO RELATED APPLICATIONS

This application claims the benefit of, and priority to, U.S. Provisional Application No. 62/807,893, entitled "UV Light Curable Adhesive and Device with UV Light Curable Adhesive," which was filed on Feb. 20, 2019, which is hereby incorporated by reference in its entirety.

FIELD

The present application is directed toward the field of ultraviolet (UV) light curable adhesives and more particularly to UV light curable adhesives which yield reduced residual monomer content.

BACKGROUND

In numerous technology fields, UV light curable adhesives, which may be referred to simply as UV adhesives, have emerged as an efficient and cost effective means to bond materials together. UV adhesives may be formulated to cure much quicker than thermally curable counterparts, allowing for high throughput processing and for essentially instantaneous bonding of various materials, including plastics, composites, and metals. UV adhesives are typically 100% solids, requiring no drying step, and are composed of polymerizable oligomers/monomers and a photoinitiator along with other additives such as rheology modifiers. Hozumi in U.S. Pat. No. 5,989,778 provides a UV adhesive comprised of these components for digital video (or versatile) disk (DVD) bonding.

There are two principal classes of photoinitiators utilized in UV adhesives and other UV curable compounds: (1) free radical photoinitiators and (2) cationic photoinitiators. Free radical photoinitiators initiate polymerization of ethylenically unsaturated compounds, including (meth)acrylate, allyl, and vinyl functional compounds, upon irradiation. Due to the short lifetime of the free radicals, the process of this type of UV curing is complete within microseconds of irradiation. However, incomplete polymerization during this short time frame results in large percentages of uncured monomer residing in the cured adhesive, which is commonly referred to as residual monomer. In contrast, cationic photopolymerization is a living polymerization, meaning that the cationically active components may continue to cure after illumination. Cationic polymerization occurs for a limited subset of compounds including olefins (e.g., isobutylene, N-vinyl compounds, vinyl ethers, styrenes) and heterocyclic monomers (e.g., aziridines, oxazolines, lactones, epoxy compounds/oxiranes, oxetanes) which are initiated by Lewis acids or Brønsted-Lowry acids released by cationic photoinitiators. The majority of UV adhesives are produced using free radical photoinitiators; however, there is a subset of UV adhesives based on cationic photopolymerization. UV polymerizations initiated by either radical or cationic photoinitiators, along with other forms of polymerization, are exothermic reactions, resulting in the release of heat, defined as the heat of polymerization.

Morin et al. in U.S. Pat. No. 10,174,146 ("Morin") discloses a composition including at least one polymerizable acrylic compound, methacrylate oligomers, limited specified thermal initiators, a photoinitiator, and a peroxide. The methods of Morin require two separate initiation mechanisms, photoinitiation for the photoinitiator and a heating step to an activation temperature of the thermal initiator, in order to cure the compositions thereof.

UV adhesives are commonly being utilized in the production of consumable medical devices, including microfluidic devices and medical sensors. Some medical sensors in production are worn on skin for long periods of time, such as continuous glucose monitoring devices, insulin pumps, cardiac monitors, sweat analysis patches, and sun exposure patches. In any wearable medical device, any free chemical irritants or sensitizers could potentially pose a risk of a skin reaction to the user if said chemicals leach from the device and come in contact with the user's skin. Many of the monomers and oligomeric compounds used in UV adhesives are known skin irritants and skin sensitizers, so reducing the concentration of these compounds in UV adhesives is of utmost concern.

In the field of electronics, any volatile materials may interfere with the performance of sensitive devices such as hard disk drives, flat panel displays (e.g., LCD, OLED, and electrophoretic displays), and microelectronic packaging materials (e.g., encapsulants, potting compounds, die attach adhesives, and underfill). There is also an emphasis on reducing the quantity of volatile organic compounds (or VOCs) from products utilized in indoor applications or enclosed spaces, such as automobiles.

BRIEF DESCRIPTION OF THE INVENTION

Exemplary embodiments are directed to UV light curable adhesives which yield reduced residual monomer content that address currently existing but unmet needs. UV adhesives according to the present disclosure are formulated such that UV irradiation of a photoinitiator triggers primary cure of the UV light curable adhesive monomer, and the primary cure of the UV light curable adhesive monomer activates a monomer scavenger to scavenge the remaining monomer in the formulation.

In one exemplary embodiment, a UV light curable adhesive includes at least one bi-active monomer, at least one polymerizable oligomer, a primary photoinitiator, and a monomer scavenger, wherein photopolymerization of the at least one bi-active monomer by the primary photoinitiator activates the monomer scavenger, reducing residual monomer content in a cured adhesive formed by the photopolymerization of the bi-active monomer in comparison to an otherwise identical comparative UV adhesive lacking the monomer scavenger.

In another exemplary embodiment, a method for curing a UV light curable adhesive includes applying the UV light curable adhesive to a surface, and exposing the UV light curable adhesive to UV light. The UV light curable adhesive includes at least one bi-active monomer, at least one polymerizable oligomer, a primary photoinitiator, and a monomer scavenger, wherein photopolymerization of the at least one bi-active monomer by the primary photoinitiator activates the monomer scavenger, reducing residual monomer content in a cured adhesive formed by the photopolymerization of the bi-active monomer in comparison to an otherwise identical comparative UV adhesive lacking the monomer scavenger. Curing the UV light curable adhesive is free from heating the UV light curable adhesive other than any autogenous increases in temperature from exothermic polymerization reactions.

In another exemplary embodiment, a device with a UV light cured adhesive includes a first component, a second component, and the UV light cured adhesive joining the first component to the second component. The UV light cured adhesive is formed from a UV light curable adhesive including at least one bi-active monomer, at least one polymerizable oligomer, a primary photoinitiator, and a monomer scavenger. The UV light cured adhesive includes a reduced residual monomer content in comparison to a comparative UV cured adhesive formed from an otherwise identical comparative UV light curable adhesive lacking the monomer scavenger.

BRIEF DESCRIPTION OF THE DRAWINGS

Wherever possible, the same reference numbers will be used throughout the drawings to represent the same parts.

DETAILED DESCRIPTION OF EXEMPLARY EMBODIMENTS

Figure 1:
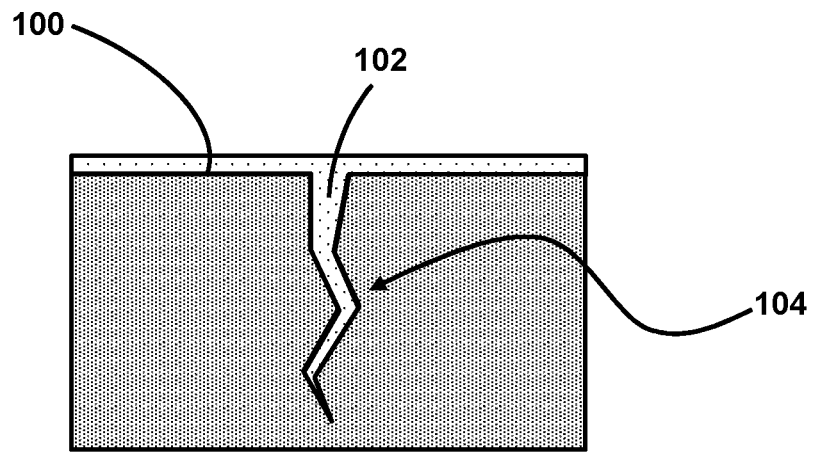
FIG. 1 is a schematic view of a UV light curable adhesive disposed on a single surface, according to an embodiment of the present disclosure.

Provided are UV light curable adhesives. Embodiments of the present disclosure, in comparison to methods not including one or more of the features disclosed herein, reduce the residual monomer content in cured adhesive from photopolymerization of the UV light curable adhesives, reduce volatile organic compounds in cured adhesive from photopolymerization of the UV light curable adhesives, reduce residual monomer content and/or volatile organic compounds in medical devices, reduce residual monomer content and/or volatile organic compounds in wearable medical devices, reduce residual monomer content and/or volatile organic compounds in electronics, or combinations thereof.

In one embodiment, a UV light curable adhesive includes at least one bi-active monomer, at least one polymerizable oligomer, a primary photoinitiator, and a monomer scavenger, wherein photopolymerization of the at least one bi-active monomer by the primary photoinitiator activates the monomer scavenger, reducing residual monomer content in a cured adhesive formed by the photopolymerization of the bi-active monomer in comparison to an otherwise identical comparative UV adhesive lacking the monomer scavenger. As used herein, a "bi-active monomer" is a monomer including an unsaturated C—C bond which is curable via both a free radical mechanism and a cationic mechanism. As used herein, a "polymerizable oligomer" is an oligomer including an unsaturated C—C bond. As used herein, "UV" is deemed to include the far violet range up to a wavelength of 420 nm.

In one embodiment, the UV light curable adhesive includes a shelf-life of at least three months, alternatively at least four months, alternatively at least five months, alternatively at least six months. Shelf-lives are measured in 30-day months.

Without being bound by theory, it is believed that activation of the monomer scavenger may occur by free radical photoinitiator fragments produced during the decomposition of the primary photoinitiator directly initiating decomposition of the monomer scavenger, by the heat of photopolymerization generated through exothermic photopolymerization of the at least one bi-active monomer by the primary photoinitiator initiating decomposition of the monomer scavenger, a free-radical pathway arising during the photopolymerization of the at least one bi-active monomer by the primary photoinitiator, or a combination thereof.

In one embodiment, the UV light curable adhesive is substantially free of solvent, alternatively essentially free of solvent, alternatively, free of solvent. As used herein, "substantially free of solvent" indicates less than 5 wt % solvent. As used herein, "essentially free of solvent" indicates less than 1 wt % solvent. As used herein, "free of solvent" indicates less than 0.1 wt % solvent.

In one embodiment, the primary photoinitiator is a free radical photoinitiator. The free radical photoinitiator may be any suitable free radical photoinitiator, including, but not limited to type I and type II photoinitiators. Type I photoinitiators may include phosphine oxide based photoinitiators, diphenyl(2,4,6-trimethylbenzoyl)phosphine oxide (TPO), ethyl-2,4,6-trimethylbenzoylphenylphosphinate (TPO-L), phenylbis(2,4,6-trimethylbenzoyl)phosphine oxide (BAPO), benzildimethylketal (Irgacure 651), dimethylhydroxyacetophenone (Darocure 1173), other related compounds, or combinations thereof. Type II photoinitiators may include 2-isopropyl thioxanthone (ITX), 4,4-bis(diethylamino)benzophenone (EMK), benzophenone, other related compounds, or combinations thereof. Type II photoinitiators may be combined with synergists, including, but not limited to, tertiary amine synergists, such as 2-ethylhexyl-4-dimethylaminobenzoate (EHA). Photoinitiators may be blended to broaden the range of absorbable UV wavelengths, for better surface cure of the adhesive, or both. Free radical photoinitiators may be incorporated in the UV light curable adhesives in any suitable amount, including, but not limited to, between 0.05% to 6%, by weight of the UV light curable adhesive, alternatively between 1% and 3%, by weight.

In one embodiment, the at least one bi-active monomer includes a cationically curable and free radically curable compound. Suitable cationically curable and free radically curable compounds include, but are not limited to, N-vinyl monomers, vinyl ethers, vinyl esters, styrenes, and combinations thereof. Suitable N-vinyl monomers include, but are not limited to, N-vinylpyrrolidone, N-vinylcaprolactam, N-methyl,N-vinyl acetamide, N-Vinylphthalimide, 5-methyl-3-vinyl-oxazolidin-2-one, N-vinylcarbazole, N-vinylformamide, N-vinylimidazole, and combinations thereof. Certain N-vinyl compounds are considered to be particularly useful for producing high bond strength to plastic components, such as those composed of polycarbonate, polymethylmethacrylate, and polyester. Blends of these compounds may also be incorporated to achieve desired properties of the final formulation.

In one embodiment, the at least one polymerizable oligomer includes at least one (meth)acrylated oligomer. The at least one (meth)acrylated oligomer may be monofunctional or multifunctional, including, but not limited to, difunctional, or combinations thereof. The at least one (meth) acrylated oligomer may include any suitable backbone chemistry, including, but not limited to, aliphatic polyurethane, aromatic polyurethane, polyester, epoxy/BPA, rubber, silicone, or combinations thereof. Suitable aliphatic polyurethane oligomers, such as, but not limited to, aliphatic polyurethane acrylate, may include the advantageous properties of minimal yellowing and high stability relative to other chemistries, although various oligomer chemistries may be combined or blended to achieve the same advantageous properties. The concentration of the at least one polymerizable oligomer in the UV light curable adhesive may depend on the viscosity of the at least one polymerizable oligomer and the desired final formulation viscosity of the UV light curable adhesive. The concentration of the at least one polymerizable oligomer in the UV light curable adhesive may range, by weight, from 2% to 98%, alternatively from 10% to 90%, alternatively from 30% to 70%, alternatively from 40% to 60%.

The monomer scavenger may include compounds which release acid in the presence of free radicals or from thermal decomposition resulting from the heat of polymerization, including, but not limited to, onium salts. Suitable onium salts include, but are not limited to, iodonium salts, sulfonium salts, pyridinium salts, and combinations thereof. The onium salts may include any suitable anion portion, including, but not limited to, tetrafluoroborate, hexafluorophosphate, hexafluoroantimonate, hexafluoroarsenate, tetrakis (pentafluorophenyl) borate, triflate, or combinations thereof.

Suitable iodonium salts include, but are not limited to, diaryliodonium salts, diaryliodonium hexafluoroantimonate, diaryliodonium hexafluorophosphate, 4-Isopropyl-4'-methyldiphenyliodonium tetrakis(pentafluorophenyl)borate, [4-[(2-hydroxytetradecyl)oxy]phenyl]phenyliodonium hexafluorophosphate, [4-[(2-hydroxytetradecyl)oxy]phenyl] phenyliodonium hexafluoroantimonate, or combinations thereof.

Suitable sulfonium salts include, but are not limited to, triarylsulfonium salts, triarylsulfonium hexafluorophosphate, triarylsulfonium hexafluoroantimonate, dialkylphenacylsulphonium salts, aryloxydiarylsulphonoxonium salts, dialkylphenacylsulphoxonium salts, (4-{[4-(diphenylsulfanylium)phenyl]sulfanyl}phenyl)diphenylsulfonium bishexafluorophosphate, or combinations thereof.

Suitable pyridinium salts include, but are not limited to, N-ethoxy-2-methylpyridinium hexafluorophosphate.

In one embodiment, the monomer scavenger may include compounds which release acid upon heating, including, but not limited to, blocked acid salts. Suitable blocked acid salts may include, but are not limited to, blocked sulfonic acids, blocked acid phosphates, blocked carboxylates, or combinations thereof. Known relevant blocked sulfonic acids include, but are not limited to, blocked dodecylbenzenesulfonic acids, blocked dinonylnaphthalene(di)sulfonic acids, blocked p-toluenesulfonic acids, blocked trifluoromethanesulfonic acid cationic thermal initiators (such as quaternary ammonium blocked trifluoromethanesulfonic acid, CXC-1614, produced by Jinshi Co. Ltd), hexafluoroantimonate cationic thermal initiators (such as quaternary ammonium blocked hexafluoroantimonate, CXC-1612, produced by Jinshi Co. Ltd), or combinations thereof. It is noted that experimentation suggests that at least certain blocked acid salts, while suitable for scavenging residual monomer, provide UV light curable adhesives having unsatisfactory shelf-lives, such as, but not limited to, UV light curable adhesives having shelf-lives of less that six months, alternatively less than five months, alternatively less than four months, alternatively less than three months, alternatively less than two months, alternatively less than one month. As such, in one embodiment, the UV light curable adhesive is free of blocked acid salts including, but not limited to, alkyl sulfonic acids.

Monomer scavengers may be incorporated in the UV light curable adhesive in any suitable amount, including, but not limited to, 0.001% to 10% by weight of the UV light curable adhesive, alternatively 0.1% to 1% by weight of the UV light curable adhesive. In one embodiment, the monomer scavenger scavenges residual monomer by a living cationic polymerization mechanism.

The UV light curable adhesive may include any suitable additives, including, but not limited to, additives which modify the rheological properties of the UV light curable adhesive, such as, but not limited to, thixotropic agents, additives which assist in the processability of the UV light curable adhesive, such as, but not limited to, defoamers, air release additives, and antifoams, additives to improve visualization of the UV light curable adhesive, such as, but not limited to, dyes, fluorescent compounds, and pigments, and combinations thereof.

Examples of thixotropic agents include, but are not limited to, precipitated silica, hydrophobically modified fumed silica, functionalized fumed silica, unmodified fumed silica, clays, cellulose acetate butyrate, and polyacrylamide based rheology modifiers. Thixotropic agents may be incorporated in the UV light curable adhesives in any suitable amount, including, but not limited to, at concentrations of the UV light curable adhesive, by weight, between 1% and 10%, alternatively between 2% and 5%.

The UV light curable adhesive may include (meth)acrylated monomers such as, but not limited to, 2-hydroxyethyl (meth)acrylate, n-butyl (meth)acrylate, acrylic acid, isobornyl (meth)acrylate, tetrahydrofufuryl (meth)acrylate, lauryl (meth)acrylate, isooctyl (meth)acrylate, isodecyl (meth) acrylate, tridecyl (meth)acrylate, N,N-dimethylacrylamide, trimethylolopropane triacrylate, 1,6-hexanediol diacrylate, other related compounds, or combinations thereof.

The UV light curable adhesive may include cationically curable monomers such as, but not limited to, aziridines, oxazolines, lactones, epoxy compounds/oxiranes, oxetanes, or combinations thereof.

In one embodiment, the residual monomer content in the cured adhesive is reduced in comparison to the otherwise identical comparative UV adhesive lacking the monomer scavenger by at least 50%, alternatively by at least 75%, alternatively by at least 80%, alternatively by at least 85%, alternatively by at least 90%, alternatively by at least 95%, alternatively by at least 98%, alternatively by at least 99%, alternatively by at least 99.9%.

In one embodiment, the total residual content in the cured adhesive (proportionate to volatile organic compounds (VOCs)) is reduced in comparison to the otherwise identical comparative UV adhesive lacking the monomer scavenger by at least 20%, alternatively by at least 35%. In particular, the residual content of monomers which are considered VOCs may be reduced by the inclusion of a monomer scavenger. As used herein, "VOC" refers to volatile organic compounds having boiling points less than 250° C., as defined by the European Union.

In one embodiment, the UV light curable adhesive includes, by weight, less than 0.1% peroxides, alternatively less than 0.075% peroxides, alternatively less than 0.05% peroxides, alternatively less than 0.025% peroxides. In a further embodiment, the UV light curable adhesive is free of peroxides.

Figure 2:
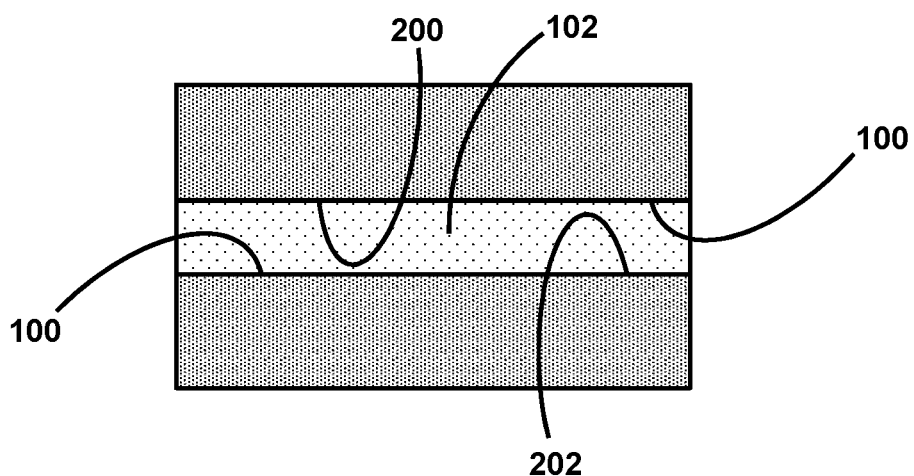
FIG. 2 is a schematic view of a UV light curable adhesive disposed on a plurality of surfaces, according to an embodiment of the present disclosure.

Referring to FIGS. 1 and 2, in one embodiment, a method for curing a UV light curable adhesive 102 (as further described above) includes applying the UV light curable adhesive 102 to a surface 100 and exposing the UV light curable adhesive 102 to UV light. In a further embodiment, curing the UV light curable adhesive 102 is free from heating the UV light curable adhesive 102 other than any autogenous increases in temperature from exothermic photopolymerization of the at least one bi-active monomer by the primary photoinitiator.

Applying the UV light curable adhesive 102 to a surface 100 may including applying the UV light curable adhesive 102 to a single surface 100 (FIG. 1) or to a plurality of surfaces 100 (FIG. 2). In one embodiment, wherein the UV light curable adhesive 102 is applied to a single surface 100 prior to exposing the UV light curable adhesive 102 to the UV light, the UV light curable adhesive 102 may seal the single surface 100, such as, by way of example, by filling cracks 104, depressions, and/or surface imperfections in the single surface 100. In another embodiment, wherein the UV light curable adhesive 102 is applied to a plurality of surfaces 100 prior to exposing the UV light curable adhesive 102 to the UV light, the UV light curable adhesive 102 may join the plurality of surfaces 100 to one another. The plurality of surfaces 100 may include a first surface 200 and a second surface 202, and any suitable number of additional surfaces 100.

In one embodiment, exposing the UV light curable adhesive 102 to the UV light is free of exposing the UV light curable adhesive 102 to light having a wavelength of 100 nm to 315 nm.

Exposing the UV light curable adhesive 102 to the UV light may include using a broad-spectrum UV light or a narrow spectrum UV light. Suitable broad-spectrum UV lights include, but are not limited to, microwave lamps such as a Fusion F300 series UV lamp equipped with an H-bulb. Suitable narrow-band UV lights include, but are not limited to UV light-emitting diodes (LED), such as a 365 nm, 385 nm, 395 nm, or 405 nm LED.

Figure 3:
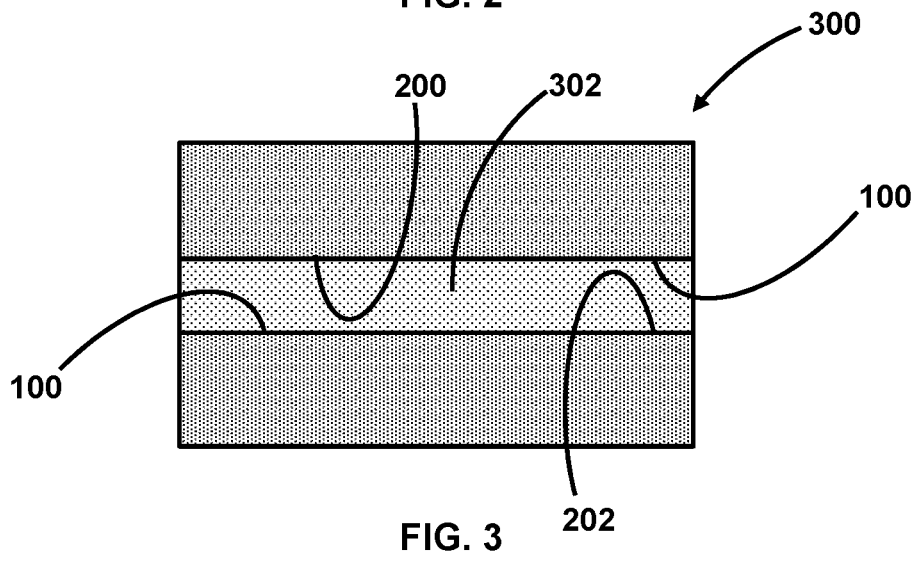
FIG. 3 is a schematic view of a device with a UV light cured adhesive, according to an embodiment of the present disclosure.

Referring to FIG. 3, in one embodiment, a device 300 includes a first surface 200, a second surface 202, and a UV light cured adhesive 302 joining the first surface 200 to the second surface 202. The UV light cured adhesive 302 is formed from a UV light curable adhesive as further described above. The UV light cured adhesive 302 includes a reduced residual monomer content in comparison to a comparative UV cured adhesive formed from an otherwise identical comparative UV light curable adhesive lacking the monomer scavenger.

The device 300 may be any suitable device 300, including, but not limited to, a wearable medical device, a skin-contacting wearable medical device, an electronic device, or combinations thereof. Suitable wearable medical devices include, but are not limited to, consumable medical devices, microfluidic devices, medical sensors, continuous glucose monitoring devices, insulin pumps, cardiac monitors, sweat analysis patches, sun exposure patches, and any drug delivery patch system or monitoring device. Suitable electronic devices include, but are not limited to, hard disk drives, flat panel displays, LCD displays, OLED displays, and electrophoretic displays.

The device 300 may be sealed with the UV light cured adhesive 302, assembled with the UV light cured adhesive 302, or combinations thereof.

EXAMPLES

The Examples described herein do not limit the invention in any way.

The compositions of Examples 1-6 and a comparative composition of Example 7 are shown in Table 1. These UV light curable adhesives were formed by combining hydrophobically modified fumed silica and silicone defoamer with aliphatic polyurethane oligomer under a high shear mixer. Once the fumed silica is dispersed, N-vinylcaprolactam was added to the high shear mixer and allowed to incorporate. This mixture was then milled through a horizontal bead mill to reduce fumed silica particle size. After milling, TPO and subsequently monomer scavenger (for Examples 1-6) were blended into the mixture under low shear.

A 1 mil (thousandths of an inch) thick layer of the compositions of Examples 1-6 was coated between two 2.0 mil polyester release liners and UV cured at 20 ft/min under illumination from a microwave UV lamp (Fusion F300 series) equipped with an H-bulb with a dose of 400 mJ/cm$^2$ at an intensity of 1 W/cm$^2$. The residual volatile content of the adhesive was then measured using static headspace GC/MS while the sample was heated to 120° C.

The viscosity of the UV adhesive samples was measured using a Brookfield DV3T HA Cone and Plate rheometer. The viscosity was recorded at a shear rate of 2.5 1/s and a temperature of 22° C.

A comparison of Examples 1-6 with comparative Example 7 illustrates that the added monomer scavengers of Examples 1-6 scavenge the cationically active monomer N-vinylcaprolactam, thus reducing the level of residual monomer and the total concentration of residuals.

A UV adhesive is considered to be shelf stable if the viscosity of the adhesive is found to be stable within a given period of time (the "shelf-life"). If viscosity does not rise more than 25% above the initial result, the UV adhesive is considered stable. As shown in Table 1, Example 3 and comparative Example 7 are found to have a greater than 6-month shelf life, whereas Example 1 has gelled after 2 months to the point that the viscosity could not be measured, and Example 2 has gelled after 3 months to the point that the viscosity could not be measured.

The above description is only illustrative of the preferred embodiments which achieve the objects, features and advantages of the present invention. It is not intended that the present invention be limited to the illustrated embodiments. While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

TABLE 1

|  | Example 1 | Example 2 | Example 3 | Example 4 |
|---|---|---|---|---|
| Difunctional Aliphatic Polyurethane Acrylate Oligomer | 53.5 wt % | 53.5 wt % | 53.5 wt % | 53.5 wt % |
| N-Vinylcaprolactam | 40.8 wt % | 40.8 wt % | 40.8 wt % | 40.8 wt % |
| Diphenyl(2,4,6-Trimethylbenzoyl)Phosphine Oxide (TPO) | 1.8 wt % | 1.8 wt % | 1.8 wt % | 1.8 wt % |

TABLE 1-continued

| | | | | |
|---|---|---|---|---|
| Hydrophobically Modified Fumed Silica | 3.0 wt % | 3.0 wt % | 3.0 wt % | 3.0 wt % |
| Silicone Based Defoamer | 0.4 wt % | 0.4 wt % | 0.4 wt % | 0.4 wt % |
| Monomer Scavengers: | | | | |
| Nacure 5414 Blocked Dodecylbenzenesulfonic Acid | 0.6 wt % | — | — | — |
| Nacure 3525 Blocked Dinonylnaphthalene disulfonic acid | — | 0.5 wt % | — | — |
| PC-2508 ([4-[(2-Hydroxytetradecyl)oxy]phenyl] phenyliodonium hexafluorophosphate) | — | — | 0.5 wt % | — |
| PC-2506 ([4-[(2-Hydroxytetradecyl)oxy]phenyl] phenyliodonium hexafluoroantimonate) | — | — | — | 0.5 wt % |
| Speedcure 992 50% solution of (4-{[4-(diphenylsulfanylium) phenyl]sulfanyl}phenyl)diphenylsulfonium bishexafluorophosphate in propylene carbonate | — | — | — | — |
| Residual N-Vinylcaprolactam | 448 ppm | 283 ppm | 102 ppm | not detected |
| Total Residual Content | 5,897 ppm | 4,974 ppm | 4,769 ppm | 3,814 ppm |
| Shelf Life | <2 months | <3 months | 6+ months | — |
| Initial Viscosity (at 2.5 1/s shear rate and 22° C.) | 3,070 | — | 2,983 | — |
| Viscosity after 6 Months (at 2.5 1/s shear rate and 22° C.) | gelled | gelled | 3,106 | — |

| | Example 5 | Example 6 | Example 7 (comparative) |
|---|---|---|---|
| Difunctional Aliphatic Polyurethane Acrylate Oligomer | 53.7 wt % | 53.3 wt % | 53.8 wt % |
| N-Vinylcaprolactam | 41.0 wt % | 40.6 wt % | 41.0 wt % |
| Diphenyl(2,4,6-Trimethylbenzoyl)Phosphine Oxide (TPO) | 1.8 wt % | 1.8 wt % | 1.8 wt % |
| Hydrophobically Modified Fumed Silica | 3.0 wt % | 3.0 wt % | 3.0 wt % |
| Silicone Based Defoamer | 0.4 wt % | 0.4 wt % | 0.4 wt % |
| Monomer Scavengers: | | | |
| Nacure 5414 Blocked Dodecylbenzenesulfonic Acid | — | — | — |
| Nacure 3525 Blocked Dinonylnaphthalene disulfonic acid | — | — | — |
| PC-2508 ([4-[(2-Hydroxytetradecyl)oxy]phenyl] phenyliodonium hexafluorophosphate) | — | — | — |
| PC-2506 ([4-[(2-Hydroxytetradecyl)oxy]phenyl] phenyliodonium hexafluoroantimonate) | 0.1 wt % | — | — |
| Speedcure 992 50% solution of (4-{[4-(diphenylsulfanylium) phenyl]sulfanyl}phenyl)diphenylsulfonium bishexafluorophosphate in propylene carbonate | — | 1 wt % | — |
| Residual N-Vinylcaprolactam | 3,464 ppm | 36 ppm | 7,719 ppm |
| Total Residual Content | 5,594 ppm | 1,786 ppm | 9,363 ppm |
| Shelf Life | — | — | 6+ months |
| Initial Viscosity (at 2.5 1/s shear rate and 22° C.) | — | — | 3,072 |
| Viscosity after 6 Months (at 2.5 1/s shear rate and 22° C.) | — | — | 3,480 |

The invention claimed is:

1. A UV light curable adhesive, comprising:
   at least one bi-active monomer;
   at least one polymerizable oligomer constituting, by weight, from 30% to 70% of the UV light curable adhesive;
   at least one thixotropic agent constituting, by weight, from 1% to 10% of the UV light curable adhesive;
   a primary photoinitiator; and
   a monomer scavenger,
   wherein photopolymerization of the at least one bi-active monomer by the primary photoinitiator activates the monomer scavenger, reducing residual monomer content in a cured adhesive formed by the photopolymerization of the bi-active monomer in comparison to an otherwise identical comparative UV adhesive lacking the monomer scavenger,
   wherein the UV light curable adhesive is free of epoxy compounds/oxiranes,
   wherein the at least one polymerizable oligomer is at least one (meth)acrylated oligomer, and
   wherein the at least one thixotropic agent includes an agent selected from the group consisting of precipitated silica, hydrophobically modified fumed silica, functionalized fumed silica, unmodified fumed silica, clays, cellulose acetate butyrate, polyacrylamide based rheology modifiers, and combinations thereof.

2. The UV light curable adhesive of claim 1, wherein the monomer scavenger includes an onium salt.

3. The UV light curable adhesive of claim 2, wherein the onium salt is selected from the group consisting of iodonium salts, sulfonium salts, pyridinium salts, and combinations thereof.

4. The UV light curable adhesive of claim 3, wherein the onium salt includes an anion portion selected from the group consisting of tetrafluoroborate, hexafluorophosphate, hexafluoroantimonate, hexafluoroarsenate, tetrakis(pentafluorophenyl) borate, triflate, and combinations thereof.

5. The UV light curable adhesive of claim 2, wherein the onium salt includes an iodonium salt selected from the group consisting of diaryliodonium salts, diaryliodonium hexafluoroantimonate, diaryliodonium hexafluorophosphate, 4-Isopropyl-4'-methyldiphenyliodonium tetrakis(pentafluorophenyl)borate, [4-[(2-hydroxytetradecyl)oxy]phenyl]phenyliodonium hexafluorophosphate, [4-[(2-hydroxytetradecyl)oxy]phenyl]phenyliodonium hexafluoroantimonate, and combinations thereof.

6. The UV light curable adhesive of claim 2, wherein the onium salt includes a sulfonium salt selected from the group consisting of triarylsulfonium salts, triarylsulfonium hexafluorophosphate, triarylsulfonium hexafluoroantimonate, dialkylphenacylsulphonium salts, aryloxydiarylsulphonoxonium salts, dialkylphenacylsulphoxonium salts, (4-{[4-(diphenyl sulfanylium)phenyl]sulfanyl}phenyl) diphenylsulfonium bishexafluorophosphate, and combinations thereof.

7. The UV light curable adhesive of claim 2, wherein the onium salt includes a pyridinium salt, and the pyridinium salt is N-ethoxy-2-methylpyridinium hexafluorophosphate.

8. The UV light curable adhesive of claim 1, wherein the UV light curable adhesive is free of blocked acid salts.

9. The UV light curable adhesive of claim 1, wherein the UV light curable adhesive is free of alkyl sulfonic acids.

10. The UV light curable adhesive of claim 1, wherein the monomer scavenger scavenges residual monomer by a living cationic polymerization mechanism.

11. The UV light curable adhesive of claim 1, wherein the UV light curable adhesive includes a shelf-life of at least three months.

12. The UV light curable adhesive of claim 1, wherein the primary photoinitiator is a free radical photoinitiator.

13. The UV light curable adhesive of claim 12, wherein the free radical photoinitiator is a phosphine oxide based photoinitiator.

14. The UV light curable adhesive of claim 1, wherein the at least one bi-active monomer includes a cationically curable and free radically curable compound selected from the group consisting of N-vinyl monomers, N-vinylpyrrolidone, N-vinylcaprolactam, N-methyl,N-vinylacetamide, N-vinylphthalimide, 5-methyl-3-vinyl-oxazolidin-2-one, N-vinylcarbazole, N-vinylformamide, N-vinylimidazole, vinyl ethers, vinyl esters, styrenes, and combinations thereof.

15. The UV light curable adhesive of claim 1, wherein the at least one (meth)acrylated oligomer has a backbone chemistry selected from the group consisting of aliphatic polyurethane, aromatic polyurethane, polyester, epoxy/BPA, rubber, silicone, and combinations thereof.

16. The UV light curable adhesive of claim 1, further comprising at least one additional monomer selected from the group consisting of 2-hydroxyethyl (meth)acrylate, n-butyl (meth)acrylate, acrylic acid, isobornyl (meth)acrylate, tetrahydrofufuryl (meth)acrylate, lauryl (meth)acrylate, isooctyl (meth)acrylate, isodecyl (meth)acrylate, tridecyl (meth)acrylate, N,N-dimethylacrylamide, trimethylolopropane triacrylate, 1,6-hexanediol diacrylate, aziridines, oxazolines, lactones, oxetanes, and combinations thereof.

17. The UV light curable adhesive of claim 1, further comprising at least one additive selected from the group consisting of rheology modifiers, defoamers, air release additives, antifoams, visualization improvement additives, dyes, fluorescent compounds, pigments, and combinations thereof.

18. The UV light curable adhesive of claim 1, wherein the residual monomer content in the cured adhesive is reduced in comparison to the otherwise identical comparative UV adhesive lacking the monomer scavenger by at least 50%.

19. The UV light curable adhesive of claim 1, wherein total residual content in the cured adhesive is reduced in comparison to the otherwise identical comparative UV adhesive lacking the monomer scavenger by at least 20%.

20. The UV light curable adhesive of claim 1, wherein volatile organic compounds in the cured adhesive are reduced in comparison to the otherwise identical comparative UV adhesive lacking the monomer scavenger by at least 20%.

21. The UV light curable adhesive of claim 1, wherein the UV light curable adhesive includes, by weight, less than 0.1% peroxides.

22. The UV light curable adhesive of claim 14, wherein the at least one bi-active monomer includes the cationically curable and free radically curable compound selected from the group consisting of N-vinylpyrrolidone, N-vinylcaprolactam, N-methyl,N-vinylacetamide, N-vinylphthalimide, 5-methyl-3-vinyl-oxazolidin-2-one, N-vinylcarbazole, N-vinylformamide, N-vinylimidazole, styrenes, and combinations thereof.

23. The UV light curable adhesive of claim 15, wherein the at least one (meth)acrylated oligomer is an aliphatic polyurethane acrylate.

24. The UV light curable adhesive of claim 23, wherein the UV light curable adhesive is free of vinyl ethers and vinyl esters.

25. A method for curing a UV light curable adhesive, comprising:
   applying the UV light curable adhesive to a surface, the UV light curable adhesive including:
      at least one bi-active monomer;
      at least one polymerizable oligomer constituting, by weight, from 30% to 70% of the UV light curable adhesive;
      at least one thixotropic agent constituting, by weight, from 1% to 10% of the UV light curable adhesive;
      a primary photoinitiator; and
      a monomer scavenger,
      wherein photopolymerization of the at least one bi-active monomer by the primary photoinitiator activates the monomer scavenger, reducing residual monomer content in a cured adhesive formed by the photopolymerization of the bi-active monomer in comparison to an otherwise identical comparative UV adhesive lacking the monomer scavenger,
      wherein the UV light curable adhesive is free of epoxy compounds/oxiranes,
      wherein the at least one polymerizable oligomer is at least one (meth)acrylated oligomer, and
      wherein the at least one thixotropic agent includes an agent selected from the group consisting of precipitated silica, hydrophobically modified fumed silica, functionalized fumed silica, unmodified fumed silica, clays, cellulose acetate butyrate, polyacrylamide based rheology modifiers, and combinations thereof
   exposing the UV light curable adhesive to UV light,
   wherein curing the UV light curable adhesive is free from heating the UV light curable adhesive other than any autogenous increases in temperature from exothermic photopolymerization of the at least one bi-active monomer by the primary photoinitiator.

26. The method of claim 25, wherein exposing the UV light curable adhesive to the UV light is free of exposing the UV light curable adhesive to light having a wavelength of 100 nm to 315 nm.

27. A device with a UV light cured adhesive, comprising:
a first surface;
a second surface; and
the UV light cured adhesive joining the first surface to the second surface,
wherein:
the UV light cured adhesive is formed from a UV light curable adhesive including:
at least one bi-active monomer;
at least one polymerizable oligomer constituting, by weight, from 30% to 70% of the UV light curable adhesive;
at least one thixotropic agent constituting, by weight, from 1% to 10% of the UV light curable adhesive;
a primary photoinitiator; and
a monomer scavenger,
wherein the UV light curable adhesive is free of epoxy compounds/oxiranes,
wherein the at least one polymerizable oligomer is at least one (meth)acrylated oligomer, and
wherein the at least one thixotropic agent includes an agent selected from the group consisting of precipitated silica, hydrophobically modified fumed silica, functionalized fumed silica, unmodified fumed silica, clays, cellulose acetate butyrate, polyacrylamide based rheology modifiers, and combinations thereof
the UV light cured adhesive includes a reduced residual monomer content in comparison to a comparative UV cured adhesive formed from an otherwise identical comparative UV light curable adhesive lacking the monomer scavenger.

28. The device of claim 27, wherein the device is a skin-contacting wearable medical device.

29. The device of claim 27, wherein the device is an electronic device.

30. The device of claim 27, wherein the device is sealed with the UV light cured adhesive.

31. The device of claim 27, wherein the device is assembled with the UV light cured adhesive.

* * * * *